(12) United States Patent
Barker

(10) Patent No.: X4371
(45) Date of Patent: Mar. 24, 1826

(54) GAUGE, SIGHT FOR BOILERS

(76) Inventor: William Barker

William Barker. Letters Patent dated 24th March 1826.

The schedule referred to in these Letters Patent and making part of the same containing a description in the words of the said William Barker himself of his improvement being a sight gauge for a steam boiler.

---

Let there be fixed on the top of the boiler a thick glass tube about 6 or 8 inches long - open at its upper end. This tube must be confined perpendicularly on the boiler above a small opening in it. There is a small tube of Metal running into the boiler directly under the glass tube, shut at its lower ends and open at its side and upper end to admit the water to pass into the glass tube.

The Metal tube is confined to the boiler and through it passes a floating piston black at its top. This piston rises and falls with the water in the boiler and exhibits the height of the water in it, by an index on the Glass tube.

What I claim as my invention, is, the combined parts of this apparatus as by me above specified and described.

Witnesses
Robert Little
Wm P. Elliot.

William Barker.

2—328 a.

DRAFTSMAN'S DIVISION.

*All communications should be addressed to*
"The Commissioner of Patents.
Washington, D. C."

*DEPARTMENT OF THE INTERIOR,*

United States Patent Office,

*Washington, D. C.,* ............, *189*...

*SIR:*

*The printed* Copies *of Patent No.* W Barker are *exhausted.* Mar 24 1826

*As soon as printed a copy will be mailed you to complete your order.*

*By direction of the Commissioner:*

*Very respectfully,*

*Chief Clerk.*

814306-97-5m